(12) United States Patent
Ho et al.

(10) Patent No.: US 8,958,752 B2
(45) Date of Patent: Feb. 17, 2015

(54) METHOD OF MANAGING INTERFERENCE IN A WIRELESS COMMUNICATION SYSTEM

(75) Inventors: Lester Tse Wee Ho, Swindon (GB); Hamid Reza Karimi, Swindon (GB); Holger Claussen, Swindon (GB); Louis Gwyn Samuel, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 2214 days.

(21) Appl. No.: 11/431,271

(22) Filed: May 10, 2006

(65) Prior Publication Data

US 2007/0264940 A1    Nov. 15, 2007

(51) Int. Cl.
*H04B 1/00*    (2006.01)
*H04W 28/04*    (2009.01)

(52) U.S. Cl.
CPC .................................. *H04W 28/048* (2013.01)
USPC ......................................................... 455/63.1

(58) Field of Classification Search
CPC .................................................. H04W 28/048
USPC ........................... 455/63.1, 436; 370/332, 466
See application file for complete search history.

(56) References Cited

U.S. PATENT DOCUMENTS

| | | | |
|---|---|---|---|
| 6,005,853 A * | 12/1999 | Wang et al. | 370/332 |
| 6,574,474 B1 * | 6/2003 | Nielsen | 455/436 |
| 7,363,008 B2 * | 4/2008 | Hassan et al. | 455/63.1 |
| 2002/0061031 A1 * | 5/2002 | Sugar et al. | 370/466 |
| 2005/0227625 A1 * | 10/2005 | Diener | 455/67.7 |

FOREIGN PATENT DOCUMENTS

| | | | | |
|---|---|---|---|---|
| EP | 0 891 110 A1 | 10/1997 | | H04Q 7/32 |
| EP | 891110 A1 * | 1/1999 | | H04Q 7/32 |

OTHER PUBLICATIONS

W. Lehr, J. Crowcroft, "Managing Shared Access to a Spectrum Commons," *In Proc. IEEE Symposium on Dynamic Spectrum Access Networks (DySpan)*, 2005.
IEEE P802.11 Wireless LANs, "Usage models IEEE 802.11-03/802r10," Jan. 2004.
EU IST Ambient Networks IST-2002-507134, Deliverable D2-1, "Multi-radio Access—Architecture Concepts".
J. Mitola, G.Q. Maguire, "Cognitive Radio: Making Software Radios More Personal," *IEEE Personal Communications*, pp. 13-18, Aug. 1999.
International PCT Search Report PCT/US2007/010326 and Written Opinion mailed Nov. 12, 2007.

* cited by examiner

*Primary Examiner* — David Bilodeau
(74) *Attorney, Agent, or Firm* — Davidson Sheehan LLP

(57) ABSTRACT

The present invention provides methods of managing interference in a wireless communication system. The methods may include receiving information indicative of a portion of an interfering signal received by a first wireless communication device, decoding the portion of the interfering signal, and providing at least one back-off instruction destined for a second wireless communication device based on the decoded portion of the interfering signal.

14 Claims, 5 Drawing Sheets

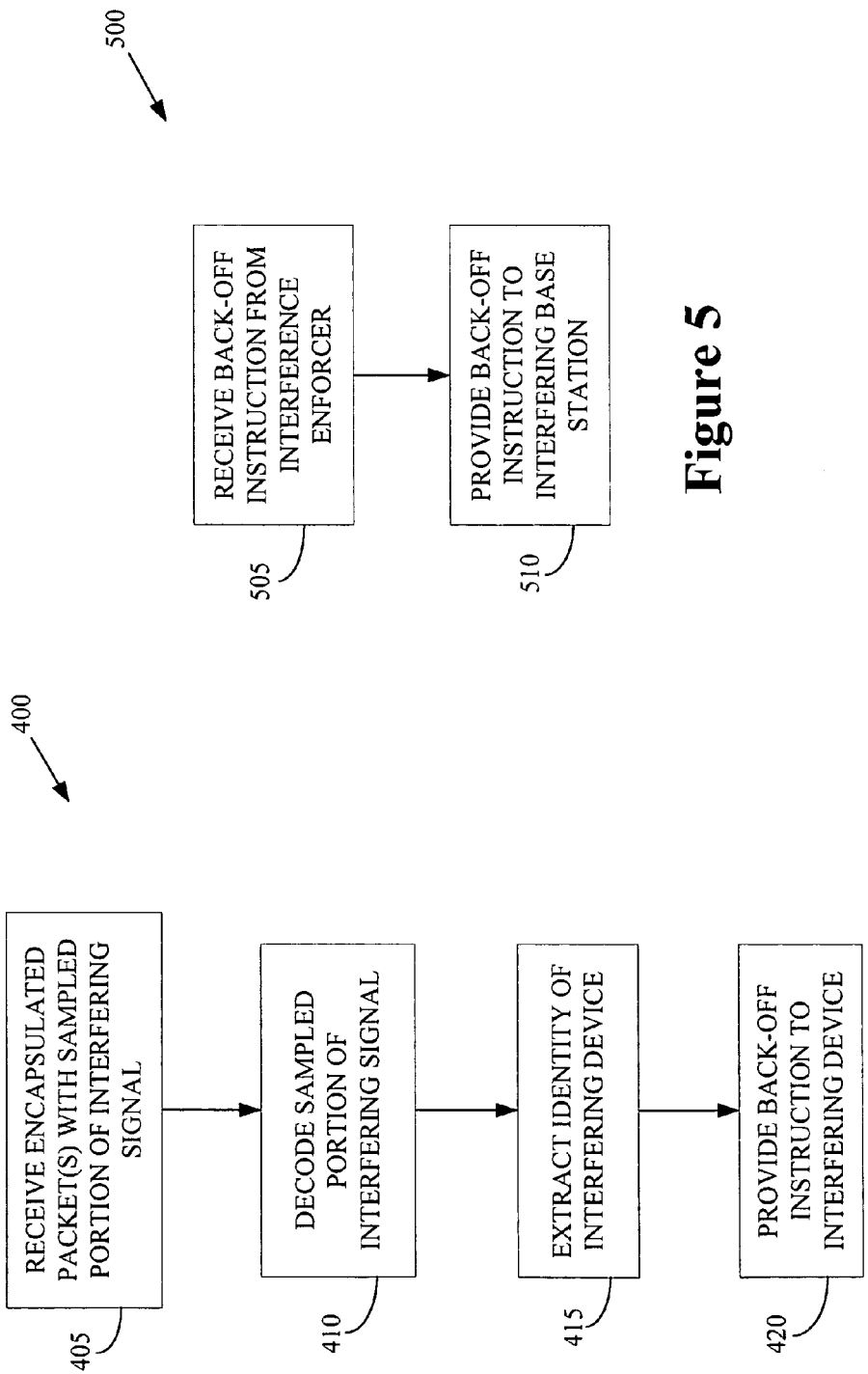

METHOD OF MANAGING INTERFERENCE IN A WIRELESS COMMUNICATION SYSTEM

BACKGROUND OF THE INVENTION

1. Field of the Invention

This invention relates generally to communication systems, and, more particularly, to wireless communication systems.

2. Description of the Related Art

Wireless communication, particularly at radio frequencies, has become commonplace in a large and rapidly increasing number of technologies. For example, wireless communication is used for transmissions between base stations and mobile units such as cellular telephones, personal data assistants, smart phones, pagers, text messaging devices, global positioning devices, navigation systems, network interface cards, notebook computers, desktop computers, and the like. Wireless technologies may also be used to provide access to various networks using shorter range transceivers that operate according to protocols such as Bluetooth, WiFi, and the IEEE 802.11 protocols. For example, a keyboard may transmit information indicative of keystrokes to a desktop computer using radiofrequency transmissions in accordance with the Bluetooth protocol. For another example, a notebook computer that includes a wireless interface card that operates according to the WiFi protocol may access the Internet via an access point located in an airport terminal.

Many conventional wireless communication systems, such as cellular telephone systems, operate in reserved frequency bands. For example, wireless communication systems that implement Universal Mobile Telecommunication System (UMTS) may operate in a reserved frequency band that extends from about 1900 MHz to about 2200 MHz. Consequently, interference between different wireless communication systems may be minimized by insuring that these systems do not transmit in overlapping frequency bands. However, the proliferation of wireless applications has led to intense competition for increasingly scarce spectrum. Awarding the remaining spectrum in a fair, consistent, and objective manner has consequently become progressively more difficult under the centralized command and control (C&C) licensing regime. The C&C approach is also inefficient and has exacerbated the scarcity of spectrum.

Techniques for sharing scarce spectrum among different wireless technologies and systems are being developed. For example, telecommunications regulatory authorities around the world (particularly Ofcom in the UK and the FCC in the US) are studying techniques for implementing more flexible, less "hands on," spectrum management policies. Some examples of lighter spectrum management regimes that have already been implemented (albeit on a small scale) include the creation of shared spectrum commons. In some cases, the shared spectrum is licensed, e.g., the shared spectral bandwidth is a private commons and the license holder can allow second party access to the spectrum. Alternatively, the shared spectrum may be an unlicensed portion of the spectrum (e.g., the shared spectral bandwidth is a public commons, such as the ISM band) and so usage by different devices is totally unrestricted.

One of the main problems with spectrum commons is interference. A diverse range of devices and radio technologies may operate in a spectrum commons (or license-exempt bands), which tends to decrease the effectiveness of conventional politeness protocols for mitigating interference. Politeness protocols typically require that each device "listen" to the transmissions currently present within the transmission bandwidth and determine whether or not other devices are using the spectrum. If other devices are transmitting, the device may wait a random amount of time before beginning a transmission. However, devices transmitting in a spectrum commons may not share the same technology and therefore may not be able to determine whether or not other devices are present. Different devices would therefore not be able to determine if their transmissions were interfering with other devices. This would be the case even in the absence of hidden terminal problems, since devices may not obey an explicit politeness protocol.

Moreover, even if a device could determine that interference from another device was present, the device may not be able to communicate with the interfering device. Due to the different technologies and/or protocols in use in the spectrum commons, devices would not necessarily be able to identify the interferer. Even if the device could identify the interferer, the device may not possess the hardware and/or software required to decode an interfering signal from the interfering device. To illustrate this point, Table 1 provides a non-exhaustive list of different radio technologies and protocols that currently co-exist in the same radiofrequency bands, but which are incompatible. Catastrophic interference may result if devices using more than one of these technologies are transmitting at the same time and in the same geographic area. There are no well-established techniques for mitigating interference with a spectrum commons, but there are ongoing efforts to develop enabling technologies for spectrum commons.

TABLE 1

List of co-existing technologies.

| Technology | Frequency Band |
| --- | --- |
| IEEE 802.11b | ISM |
| IEEE 802.11g | ISM |
| IEEE 802.15.1 (Bluetooth) | ISM |
| IEEE 802.15.3 | ISM |
| IEEE 802.15.4 | ISM |
| Cordless Phone | ISM |
| Video Transmitter | ISM |
| Microwave Oven | ISM |
| IEEE 802.11a | U-NII |
| IEEE 802.15.3a (UWB) | Tbd |
| IEEE 802.16a | 2-16 GHz |
| Cordless Phone | U-NII |
| Non-OFDM Video Transmitter | U-NII |

ISM: Industrial, Science and Medical 2.4 GHz band: 2401-2483 MHz.
U-NII: Unlicensed National Information Infrastructure 5.0 GHz band: 5150-5350 MHz and 5785-5825 MHz.

Common multi-radio medium access control layer (CMR-MAC) is an approach for controlling diverse radio access technologies. In CMR-MAC, devices that implement different access technologies and standards operate a common, compatible MAC. Current research efforts concentrate on enabling the cooperation of access technologies that are mutually non-interfering (i.e. operating on different spectrum bands), for example transmitting data via multiple access technologies to a destination. Therefore, CMR-MAC can potentially be a way of coordinating the co-existence of multiple technologies, it is not able to mitigate interference between devices transmitting in the same spectrum. To be effective, the CMR-MAC protocols would also have to be adopted by everyone as a standard. Moreover, CMR-MAC would reside in the lower layers of the protocol stack and hence would influence the higher layers, which would result in a tight coupling between CMR-MAC and the access technology. This makes it difficult to implement for all access technologies because the access technology would have to be built around the CMR-MAC.

Cognitive radio through opportunistic access is a proposed technique that requires that the transceiver make changes to particular transmission or reception parameters to perform a particular task in shared spectrum. The changes may be made based on observations of the radio spectrum. Software-defined radios are considered a key technology for enabling cognitive radio. A software-defined radio uses software technologies for the dynamic reconfiguration of the radio, so that a single transceiver can understand and use multiple radio access technologies. However, cognitive radio is still an immature technology and significant developments in many different fields are required before it becomes technologically and economically feasible. Software-defined radios are not mature and would result in more complex (and therefore expensive) transceivers with higher power consumptions, which would reduce battery-life in battery-powered devices. Receivers are also currently unable to reconfigure themselves fast enough to scan all available radio technologies.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for managing interference in a wireless communication system. The method may include receiving information indicative of a portion of an interfering signal received by a first wireless communication device, decoding the portion of the interfering signal, and providing at least one back-off instruction destined for a second wireless communication device based on the decoded portion of the interfering signal.

In another embodiment of the present invention, a method is provided for managing interference in a wireless communication system. The method may include receiving an interfering signal, determining whether the interfering signal was received from at least one wireless communication device, and providing information indicative of a portion of the interfering signal in response to determining that the interfering signal was received from said at least one wireless communication device.

BRIEF DESCRIPTION OF THE DRAWINGS

The invention may be understood by reference to the following description taken in conjunction with the accompanying drawings, in which like reference numerals identify like elements, and in which:

FIG. 4 conceptually illustrates one exemplary embodiment of a method of decoding interfering signals and providing back-off instructions, in accordance with the present invention;

FIG. 5 conceptually illustrates one exemplary embodiment of a method of providing a back-off instruction from one wireless communication device to another wireless communication device, in accordance with the present invention.

Figure 1:
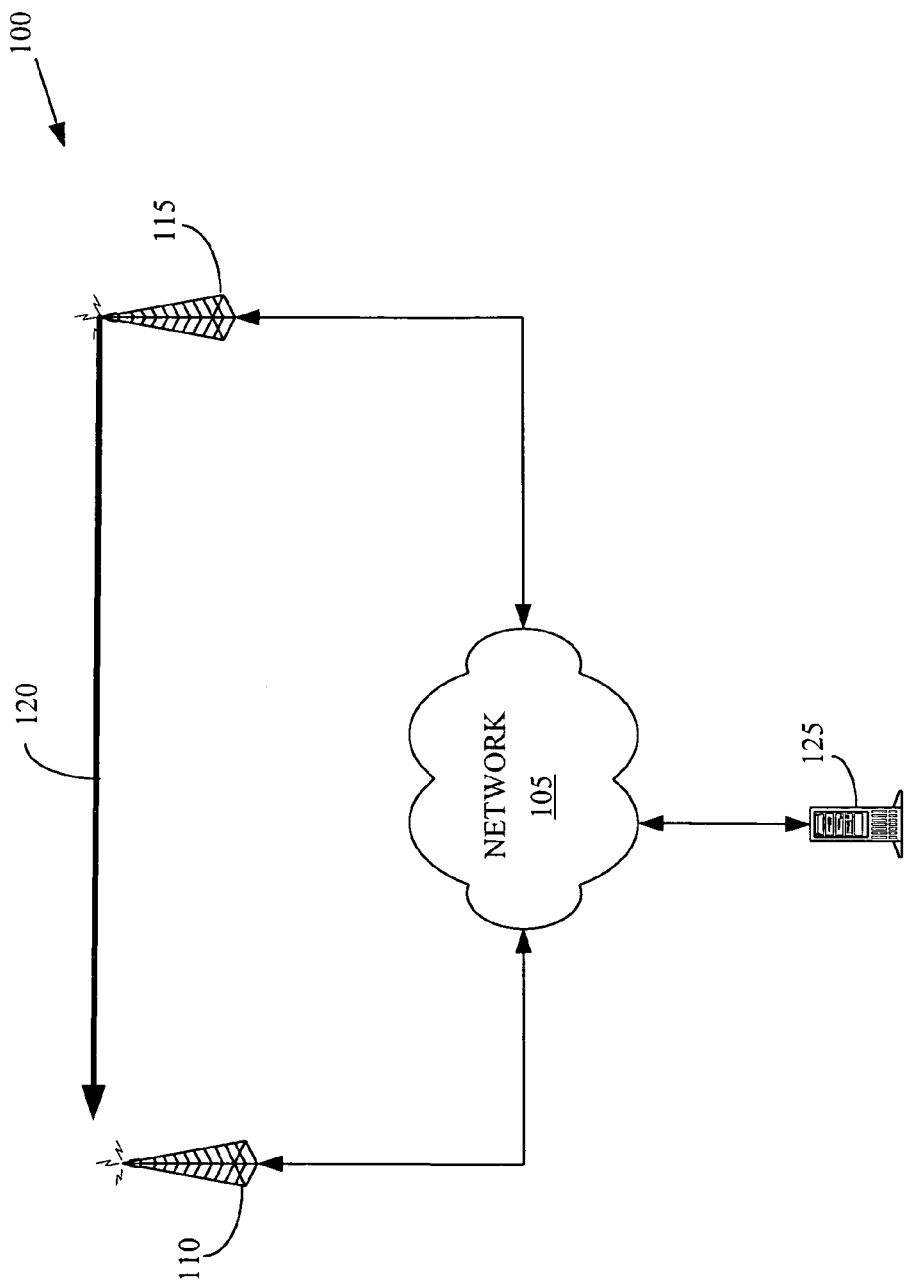
FIG. 1 conceptually illustrates a first exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a wireless communication system 100. In the illustrated embodiment, the wireless communication system 100 includes a network 105 that may be used to transmit information between different entities that are communicatively coupled to the network 105. The network 105 may operate according to one or more standards and communicate information according to one or more wired and/or wireless communication protocols. For example, the network 105 may be an Internet. However, the protocols and/or standards implemented in the network 105 are matters of design choice and are not material to the present invention.

The wireless communication system 100 also includes a plurality of wireless communication devices 110, 115 that are communicatively coupled to the network 105. Although two wireless communication devices 110, 115 are shown in FIG. 1, persons of ordinary skill in the art having benefit of the present disclosure should appreciate that the wireless communication system 100 may include any number of wireless communication devices 110, 115. In the illustrated embodiment, the wireless communication devices 110, 115 are base stations 110, 115. However, persons of ordinary skill in the art having benefit of the present disclosure should appreciate that the present invention is not limited to base stations 110, 115. In alternative embodiment, the wireless communication devices 110, 115 may be base station routers, access points, and the like. The wireless communication devices 110, 115 may also be mobile units such as cellular telephones, personal data assistants, smart phones, pagers, text messaging devices, global positioning devices, network interface cards, notebook computers, desktop computers, and the like.

The base station 110 may not be able to identify and/or decode information transmitted by the base station 115. Thus, a signal 120 transmitted by the base station 115 may be interpreted by the base station 110 as an interfering signal 120. As used herein, the term "interfering signal" will be used to refer to any signal that interferes with signals that a wireless communication device is attempting to receive and/or decode. Interfering signals may include ambient, thermal, and/or environmental noise within the portion of the spectrum that includes the signals that the wireless communication device is attempting to receive and/or decode. Interfering signals may also include signals provided by other wireless communication devices that are not recognized by the wireless communication device and/or cannot be decoded by the wireless communication device. For example, a wireless communication device that operates according to a CDMA protocol may not recognize or be able to decode signals that are transmitted according to a TDMA protocol. Signals transmitted according to a TDMA protocol may therefore interfere with signals that are transmitted to the wireless communication device using a CDMA protocol. Interfering signals are typically interpreted as random noise by wireless communication devices, although this may not necessarily be the case in every situation.

The base station 110 may determine that the interfering signal 120 is not ambient noise and is being transmitted by another wireless communication device (e.g., the base station 115). However, since the base station 110 operates according to a different protocol, it may not be able to decode the interfering signal 120 or to identify which wireless communication device is providing the interfering signal 120. The base station 110 may therefore provide samples of the interfering signal 120 (and perhaps other information associated with the interfering signal 120) to an interference enforcer 125 that is communicatively coupled to the network 105. The interference enforcer 125 may be implemented in hardware, firmware, software, or any combination thereof. Moreover, the interference enforcer 125 may be implemented in a single device or in more than one device.

The interference enforcer 125 may decode the samples of the interfering signal 120 provided by the base station 110, as will be discussed in detail below. The interference enforcer may then use the decoded samples of the interference signal 120 to identify the wireless communication device that is transmitting the interfering signal 120 (e.g., the base station 115) and provide a back-off instruction to the base station 115. As used herein, the term "back-off instruction" will be understood to refer to any instruction that indicates that a wireless communication device should modify transmissions so as to reduce interference at other wireless communication devices. Exemplary back-off instructions include, but are not limited to, power-down instructions, instructions to change one or more channels that are being used for a transmission, instructions to discontinue transmissions on one or more channels, and the like. In one embodiment, the interference enforcer 125 may also enforce penalties for providing the interfering signal 120, such as a monetary penalty, a withdrawal of transmission rights, and the like.

Figure 2:
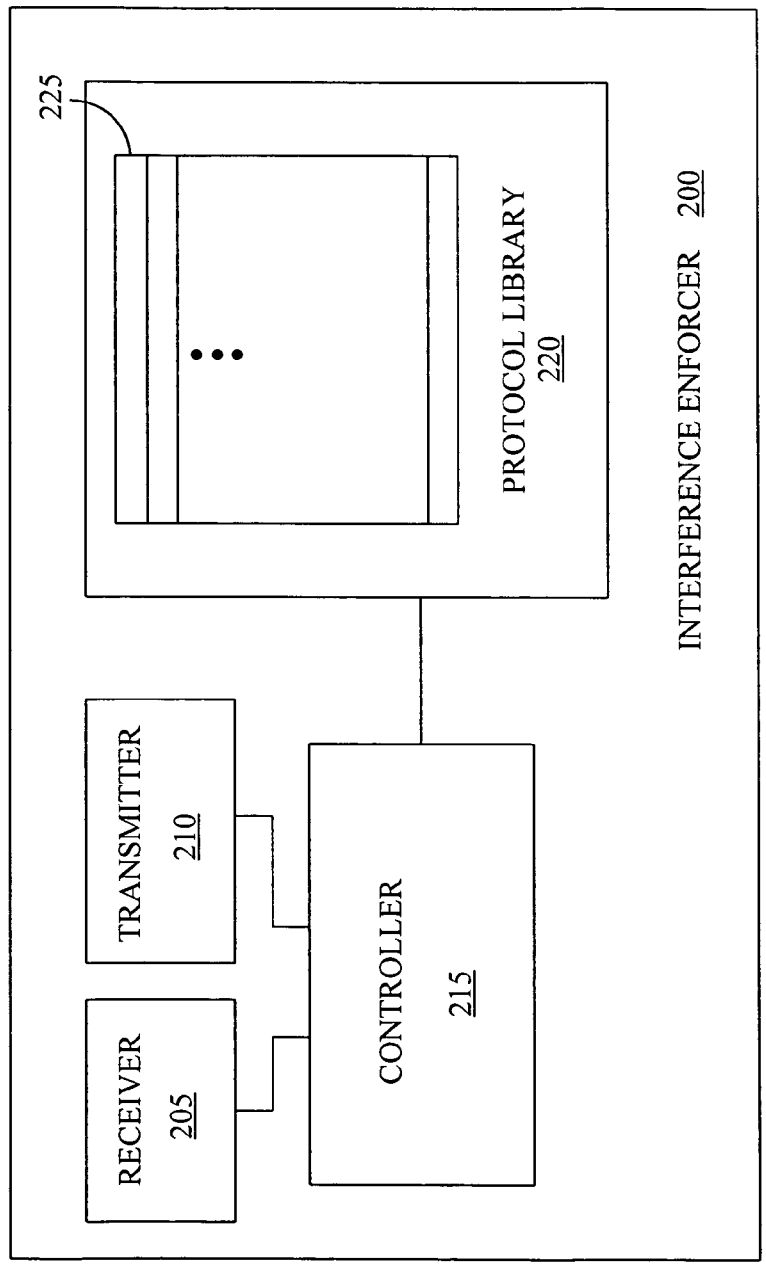
FIG. 2 conceptually illustrates one exemplary embodiment of an interference enforcer, in accordance with the present invention.

FIG. 2 conceptually illustrates one exemplary embodiment of an interference enforcer 200. In the illustrated embodiment, the interference enforcer 200 includes a receiver 205 and a transmitter 210, which may be implemented in hardware, firmware, software, or any combination thereof. Although the receiver 205 and the transmitter 210 are depicted as separate entities in FIG. 2, persons of ordinary skill in the art having benefit of the present disclosure should appreciate that the receiver 205 and the transmitter 210 may alternatively be implemented in a single device, such as a transceiver, or in some other combination of devices. The receiver 205 and the transmitter 210 are configured to receive and transmit signals, respectively. The signals may be received and/or transmitted according to any protocol. However, as will be discussed in detail below, the interference enforcer 200 is generally capable of receiving, decoding, encoding, and transmitting signals and/or messages according to a plurality of protocols.

In one embodiment, the receiver 205 receives information indicative of an interfering signal from a wireless communication device, such as the base station 110 shown in FIG. 1. For example, the receiver 205 may receive one or more packets that include encapsulated information indicative of portions of the interfering signal. The packets may be formed according to one or more protocols that are understood by the wireless communication device, but the portions of the interfering signal may have been formed, encoded, and/or transmitted according to one or more other protocols that the wireless communication device may be unable to identify, understand, and/or decode, as discussed above. Thus, as discussed above, the encapsulated information may be formed by sampling the interfering signal.

A controller 215 in the interference enforcer 200 accesses the information indicative of the interfering signal. For example, the receiver 205 may strip headers and/or any other encapsulation information from the received packet and may then provide the encapsulated information indicative of the interfering signal to the controller 215. Although not shown in FIG. 2, persons of ordinary skill in the art having benefit of the present disclosure should appreciate that the interference enforcer 200, the receiver 205, and/or the controller 215 may include memory elements, buffers, registers, and the like for storing the received packets and/or the encapsulated information indicative of the interfering signal. Accordingly, the receiver 205 may provide the encapsulated information to one of the storage elements and the controller 215 may access the encapsulated information from one of the storage elements. The controller 215 may then attempt to decode the information indicative of the interfering signal.

In the illustrated embodiment, the interference enforcer 200 includes (or has access to) a protocol library 220 of one or more radio access protocol stacks 225. Each of the radio access protocol stacks 225 may be used to decode signals that were formed and/or encoded according to one or more associated protocols. Accordingly, the controller 215 may search the protocol library 220 for a radio access protocol stack 225 that can successfully decode the information indicative of the interfering signal. For example, the controller 215 may step through the radio access protocol stacks 225 and attempt to decode a portion of the information indicative of the interfering signal with each radio access protocol stack 225. If the controller 215 successfully decodes the portion of the information indicative of the interfering signal using one of the radio access protocol stacks 225, the controller 215 may then use this radio access protocol stack 225 to decode all of the information indicative of the interfering signal. In one embodiment, the controller 215 may also use other information provided by the wireless communication device to identify the appropriate radio access protocol stack 225, as will be discussed in detail below.

The controller 215 may then use the decoded samples of the interfering signal to identify one or more wireless communication devices that are transmitting the interfering signal. For example, the decoded information may include information indicative of an identity of (and/or an address associated with) one or more wireless communication devices that are transmitting the interfering signal. The controller 215 may then form a back-off instruction that can be provided to the interfering wireless communication devices using the transmitter 210. In one embodiment, the controller 215 forms a message including the back-off instruction according to the one or more protocols used by the interfering wireless communication devices and then provides this message to the interfering wireless communication devices. Alternatively, the controller 215 forms a message including the back-off instruction according to the protocols used by the interfering wireless communication devices and then encapsulate this message using one or more protocols understood by the wireless communication device that is receiving the interfering signal. The encapsulated message may then be provided to the wireless communication device that is receiving the interfering signal, and this device may provide the message including the back-off instruction to the interfering wireless communication device. As discussed above, the interference enforcer 200 may also enforce penalties for providing the interfering signal, such as a monetary penalty, a withdrawal of transmission rights, and the like.

Figure 3:
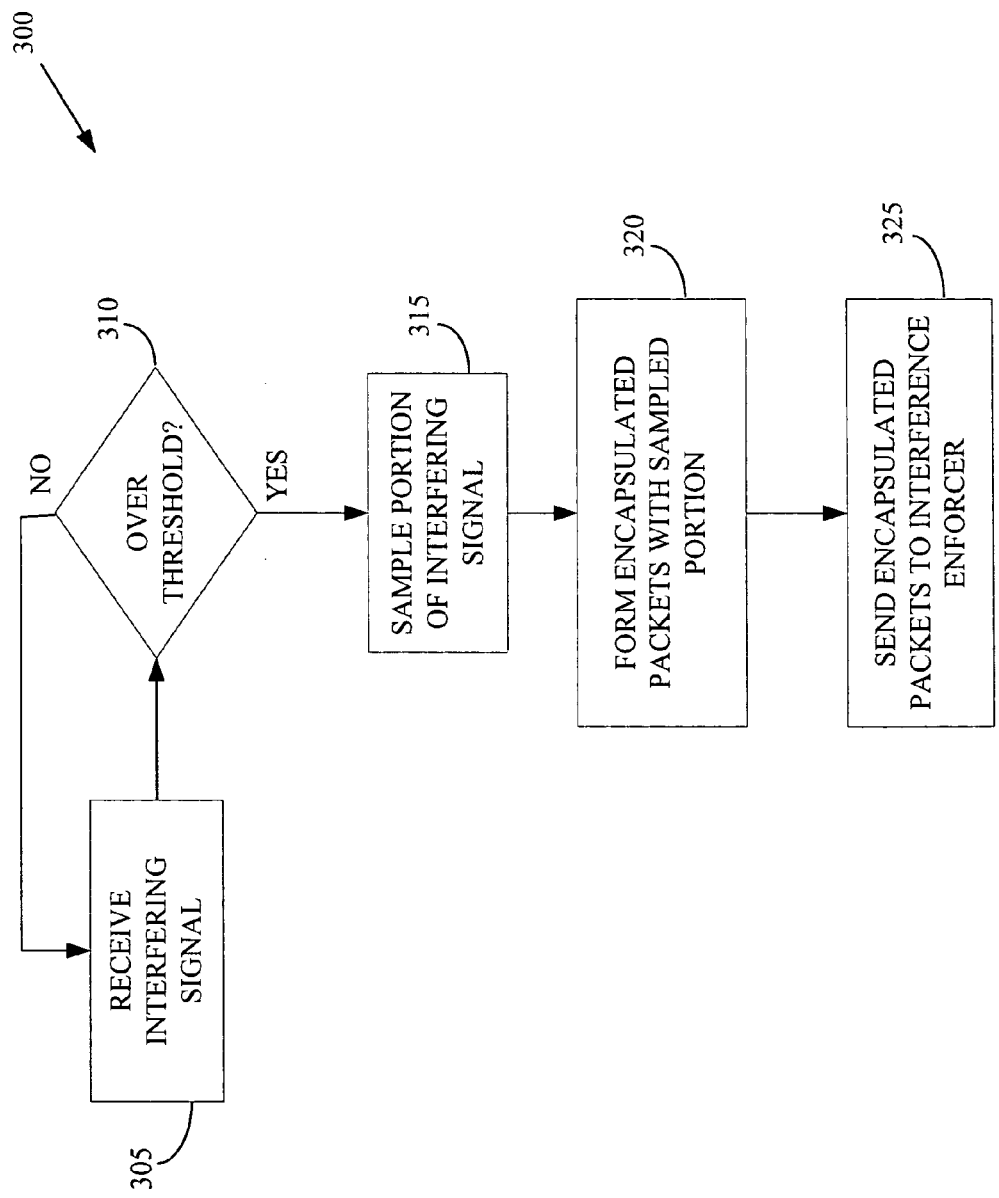
FIG. 3 conceptually illustrates one exemplary embodiment of a method for identifying an interfering signal and providing information indicative of the interfering signal, in accordance with the present invention.

FIG. 3 conceptually illustrates one exemplary embodiment of a method 300 for identifying an interfering signal and providing information indicative of the interfering signal. In the illustrated embodiment, a wireless communication device, such as the base station 110 shown in FIG. 1, receives (at 305) an interfering signal and determines (at 310) whether the interfering signal is likely to be provided by another wireless communication device or devices. For example, the wireless communication device may determine (at 310) an interfering signal strength and an ambient noise level within the frequency band associated with the interfering signal. If the interfering signal strength is less than or approximately equal to a threshold determined by the ambient noise level, then the wireless communication device may determine (at 310) that the interfering signal is not provided by another wireless communication device or devices. The wireless communication device may then continue to monitor and/or receive (at 305) interfering signals.

If the interfering signal strength is determined (at 310) to be above the threshold determined by the ambient noise level, then the wireless communication device may conclude that another wireless communication device or devices is providing the interfering signal. The wireless communication device may then sample (at 315) a portion of the interfering signal. Techniques for sampling signals are well-known in the art and in the interest of clarity will not be discussed further herein. In one embodiment, the wireless communication device may also attempt to decode the interfering signal. The wireless communication device may use the results of the decoding attempt to identify the interfering wireless communication device or devices. The wireless communication device may also gather or access other information associated with the interfering device(s), such as known sources of interference, the frequency band of the interference, location information associated with (or derived from) the interfering signals, and the like.

The wireless communication device may then form (at 320) one or more encapsulated packets including the sampled portion of the interfering signal as a payload. In one embodiment, the encapsulated packets may also include other information associated with the interfering signal, such as the information discussed above. Alternatively, this information, if available, may be provided in other packets. The encapsulated packets may then be sent (at 325) to an interference enforcer, e.g., via an Internet or other network. The interference enforcer may then attempt to decode the sampled portion of the interfering signal.

FIG. 4 conceptually illustrates one exemplary embodiment of a method 400 of decoding interfering signals and providing back-off instructions. In the illustrated embodiment, an interference enforcer, such as the interference enforcer 200 shown in FIG. 2, receives (at 405) one or more packets including information indicative of an interfering signal detected by a first wireless communication device. For example, the interference enforcer may receive (at 405) encapsulated packets including sampled portions of the interfering signal as a payload. In one embodiment, the interference enforcer may also receive other information associated with the interfering signal such as known sources of interference, a frequency band of the interference, location information, and the like.

The interference enforcer attempts to decode (at 410) the sampled portion of the interfering signal, e.g., using a library of protocol stacks as discussed above. The interference enforcer then extracts (at 415) an identity and/or an address associated with the interfering wireless communication device from the decoded portion of the interfering signal. The identity and/or address of the interfering wireless communication device may then be used to provide (at 420) a back-off instruction to the interfering wireless communication device, as discussed above. In one embodiment, the interference enforcer provides (at 420) the back-off instruction to the interfering wireless communication device via a network. Alternatively, the interference enforcer may provide (at 420) the back-off instruction (or a message containing the back-off instruction) to the first wireless communication device, which may then provide the back-off instruction to the interfering wireless communication device, e.g., over an air interface between the two wireless communication devices.

FIG. 5 conceptually illustrates one exemplary embodiment of a method of providing a back-off instruction from a first wireless communication device to a second wireless communication device. In the illustrated embodiment, the first wireless communication device receives (at 505) a message including a back-off instruction from an interference enforcer. Since the first and second wireless communication devices may not operate according to the same protocol, the message received (at 505) by the first wireless communication device may be a packet that is encoded according to a first protocol understood by the first wireless communication device. However, the message may include a payload that is encoded according to a second protocol that is understood by the second wireless communication device.

The first wireless communication device may then provide (at 510) at least a portion of the message including the back-off instruction to the second wireless communication device, e.g., over an air interface between the first and second wireless communication devices. In one embodiment, the first wireless communication device may decode the message provided by the interference enforcer according to the first protocol, strip off headers and/or other encapsulation information that may be included in the message, and provide (at 510) a portion of the message encoded (by the interference enforcer) according to the second protocol.

Figure 6:
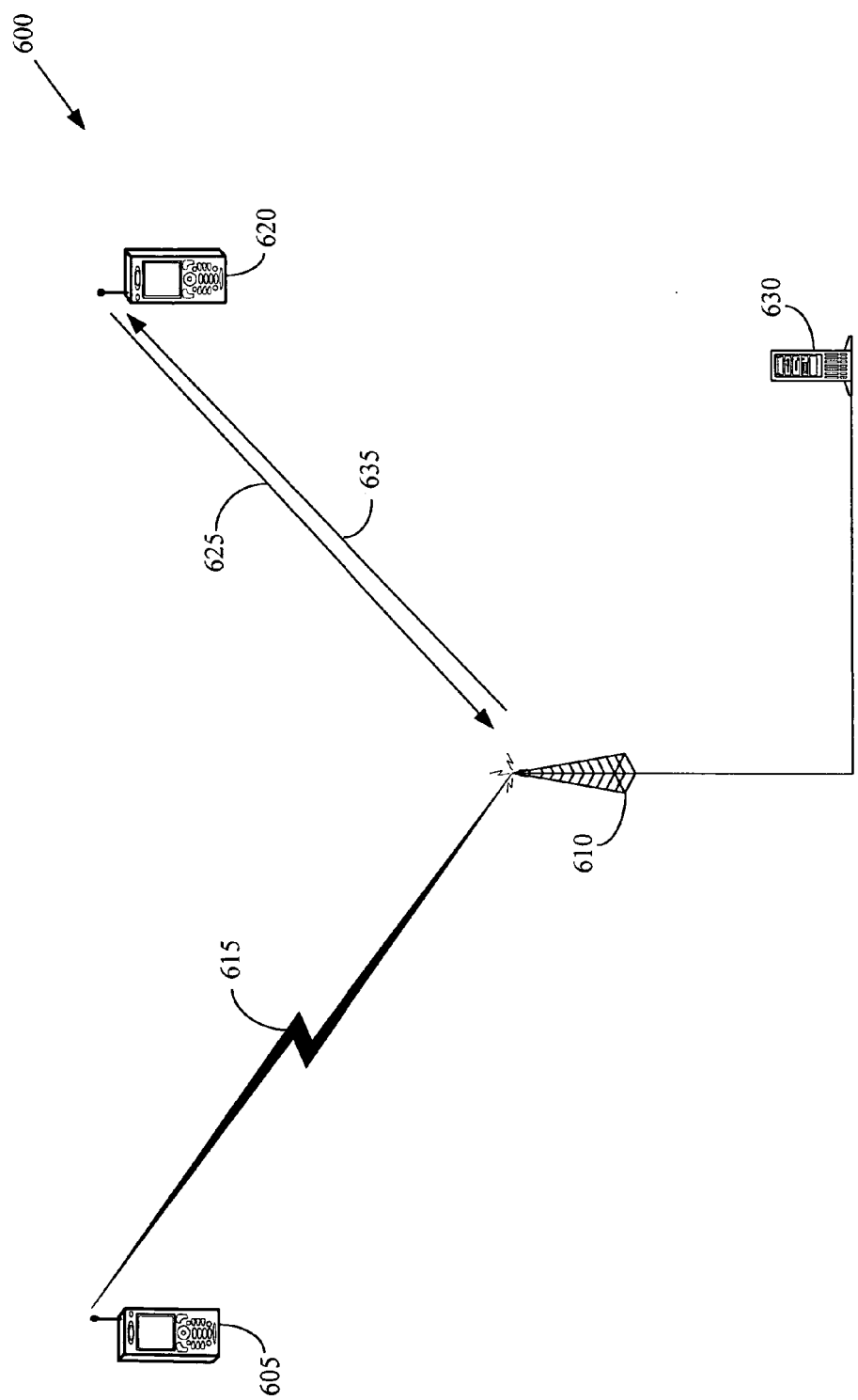
FIG. 6 conceptually illustrates a second exemplary embodiment of the wireless communication system, in accordance with the present invention.

FIG. 6 conceptually illustrates a second exemplary embodiment of the wireless communication system 600. In the illustrated embodiment, an access terminal 605 has an existing wireless communication connection with an access network 610 over an air interface 615. The wireless communication system 600 also includes an access terminal 620 that is hidden from the access terminal 605. As used herein and in accordance with common usage in the art, the term "hidden terminal" will be understood to refer to a first terminal that may transmit signals that cannot be detected by a second terminal. For example, if the distance between the first and second terminals is too large, the first and second terminals may not be able to detect the presence of transmissions by the other terminal and therefore these terminals are "hidden" from each other. For another example, one or more obstacles, such as buildings, geographical features, and the like, may prevent the first and/or second terminals from detecting the presence of transmissions by the other terminal.

In the illustrated embodiment, the access terminal 620 attempts to initiate communication with the access network 610 using a frequency channel that is shared with the access terminal 605, as indicated by the arrow 625. Since the access terminals 605, 615 are hidden from each other, the access terminal 620 may not be able to detect the presence of transmissions by the access terminal 605 and so may violate the relevant politeness protocol(s) and transmit the session initiation message 625 during a time period that overlaps with transmissions by the access terminal 605 over the existing air interface 615. The transmissions by the access terminal 620 may then interfere with transmissions by the access terminal 605.

The access network 610 may determine that the signals 625 transmitted by the access terminal 620 are interfering signals. Portions of the interfering signals from the access terminal 620 may therefore be sampled and provided to an interference enforcer 630. For example, as discussed above, the access network 610 may provide one or more packets that include sampled portions of the interfering signals as payloads. The interference enforcer 630 may then decode the interfering signal (if the interfering signal has not already been decoded at the access network 610) and form a back-off instruction for the access terminal 620. In the illustrated embodiment, the interference enforcer 630 provides the back-off instruction to the access network 610, which then provides the back-off instruction to the access terminal 620 over an air interface, as indicated by the arrow 635. Alternatively, the interference enforcer 630 may provide the back-off instruction to the access terminal 620 via another pathway (not shown in FIG. 6).

Embodiments of the techniques for interference enforcement described above may have a number of advantages over conventional practice. For example, wireless communication devices are not required to decode and/or understand signals that may be provided by numerous different radio access technologies and/or protocols. Accordingly, the hardware, firmware, and/or software requirements (and associated costs) for wireless communication devices may be significantly lower than wireless communication devices that attempt to decode and/or understand numerous radio access technologies and/or protocols. Moreover, embodiments of the techniques described above can be implemented using present technologies with few changes to legacy standards and/or equipment. Accordingly, the approaches described above may be pragmatic and feasible techniques for supporting the use of multiple radio access technologies within common wireless spectrum frequency bands.

Maintaining and/or upgrading wireless communication systems that implement the techniques described above may be less difficult than maintaining and/or upgrading wireless communication systems that utilize a distributed approach to interference enforcement, such as the methods proposed for use in cognitive radio techniques. In particular, introducing new access technologies may only entail updates to the interference enforcer, whereas distributed approaches would require updates to every single receiver in the wireless communication system. The interference enforcer techniques described above may also provide a convenient mechanism for telecommunications regulatory authorities to enforce control over spectrum usage while maintaining a relatively light touch approach to regulation.

The techniques described above may also be used to overcome hidden terminal problems. The techniques described above are not typically tightly coupled to the operation of the politeness protocols that may be implemented in different wireless communication systems. Accordingly, these interference enforcement techniques may work well in the context of the Distributed Coordination Function implemented in media access control layers defined by the IEEE 802.11 standards. In contrast, the Point Coordination Function described in the IEEE 802.11 standards may help overcome hidden terminal problems but at the cost of modifying a distributed system into a fully centrally controlled system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving, at a server, information indicative of at least a portion of an interfering signal received by a first wireless communication device, the interfering signal being transmitted by a second wireless communication device;
   determining, at the server, an identity of the second wireless communication device by decoding the received portion of the interfering signal using at least one protocol used to encode the interfering signal; and
   providing, from the server at least one back-off instruction destined for the second wireless communication device using the identity of the second wireless communication device.

2. The method of claim 1, wherein receiving the information indicative of the portion of the interfering signal comprises receiving at least one packet including encapsulated information indicative of the portion of the interfering signal.

3. The method of claim 1, wherein decoding the portion of the interfering signal comprises determining that the interfering signal is an encoded signal provided by the second wireless communication device.

4. The method of claim 3, wherein decoding the portion of the interfering signal comprises determining that the interfering signal is an encoded signal provided by a hidden wireless communication device.

5. The method of claim 3, wherein decoding the portion of the interfering signal comprises determining said at least one protocol that the second wireless communication device used to encode the interfering signal.

6. The method of claim 5, wherein determining said at least one protocol comprises determining said at least one protocol based on at least one protocol library maintained at the server.

7. The method of claim 5, wherein determining said at least one protocol comprises determining said at least one protocol using information indicative of said at least one protocol provided by the first wireless communication device.

8. A method, comprising:
   receiving, at a first wireless communication device, an interfering signal;
   determining, at the first wireless communication device, whether the interfering signal was received from at least one second wireless communication device;
   providing, from the first wireless communication device to a server, samples of at least a portion of the interfering signal in response to determining that the interfering signal was received from said at least one second wireless communication device; and
   receiving at the first wireless communication device and from the server, information indicative of at least one back-off instruction destined for said at least one second wireless communication device.

9. The method of claim 8, wherein determining whether the interfering signal was provided by said at least one second wireless communication device comprises comparing the interfering signal strength with an ambient noise level.

10. The method of claim 9, wherein determining whether the interfering signal was provided by said at least one second wireless communication device comprises determining that the interfering signal was provided by said at least one second wireless communication device when the interfering signal strength exceeds the ambient noise level.

11. The method of claim 8, comprising forming the samples by sampling a portion of the interfering signal.

12. The method of claim 11, wherein providing the samples of the interfering signal comprises forming at least one packet by encapsulating the samples.

13. The method of claim 12, wherein providing the samples of the interfering signal comprises providing said at least one packet including encapsulated samples to the server.

14. The method of claim 8, comprising providing, from the first wireless communication device, said at least one back-off instruction to said at least one second wireless communication device.

* * * * *